(12) United States Patent
Ge

(10) Patent No.: US 11,374,506 B2
(45) Date of Patent: Jun. 28, 2022

(54) CONTROL METHOD AND SYSTEM FOR REDUCING VIBRATION OF SECOND CASING OF MOBILE TERMINAL

(71) Applicant: AAC Technologies Pte. Ltd., Singapore (SG)

(72) Inventor: Huan Ge, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 190 days.

(21) Appl. No.: 16/992,126

(22) Filed: Aug. 13, 2020

(65) Prior Publication Data
US 2020/0412278 A1  Dec. 31, 2020

Related U.S. Application Data

(63) Continuation of application No. PCT/CN2019/093943, filed on Jun. 29, 2019.

(51) Int. Cl.
*H02N 2/00* (2006.01)
*H04M 1/02* (2006.01)
*G06F 3/01* (2006.01)

(52) U.S. Cl.
CPC ............ *H02N 2/008* (2013.01); *H02N 2/001* (2013.01); *H04M 1/0266* (2013.01); *G06F 3/016* (2013.01)

(58) Field of Classification Search
CPC ..... H02N 2/008; H02N 2/001; H04M 1/0266; H04M 1/026; H04M 1/72454; G06F 3/016
See application file for complete search history.

(56) References Cited

U.S. PATENT DOCUMENTS 9,983,671 B2 * 5/2018 Adachi .................. G06F 3/016

\* cited by examiner

*Primary Examiner* — Emily P Pham
(74) *Attorney, Agent, or Firm* — W&G Law Group

(57) ABSTRACT

A control method for reducing vibration of a second casing of a mobile terminal includes: mounting an additional vibrator in a mounting area on the second casing, and measuring vibration responses in the mounting area under first and second preset conditions; calculating system transfer functions of the additional vibrator and a driving system formed by a first casing and an exciter; providing a signal processing unit; adjusting the value of the transfer function of the signal processing unit such that a vibration response in the mounting area under a third preset condition is at zero, and calculating the value of the transfer function H3(S) of the signal processing unit; and setting H3(S) as a preset transfer function of the signal processing unit. The present disclosure can counteract the vibration of the second casing induced by the driving system, thereby improving user experience.

10 Claims, 3 Drawing Sheets

CONTROL METHOD AND SYSTEM FOR REDUCING VIBRATION OF SECOND CASING OF MOBILE TERMINAL

CROSS REFERENCE TO RELATED APPLICATIONS

This non-provisional patent application is a continuation application of International Application PCT/CN2019/093943, filed on Jun. 29, 2019, all contents of which are incorporated herein by reference.

FIELD OF THE INVENTION

The present disclosure relates generally to the field of mobile terminals and, in particular, to a control method and system for reducing vibration of a second casing of a mobile terminal.

BACKGROUND

With the rapid development of science and technology, mobile terminals are becoming more and more popular.

In the related art, one of such mobile terminals includes a first casing, a second casing, and an exciter. The exciter drives the first casing to vibrate so as to provide tactile feedback or information reminder to the user. However, the vibration of the first casing may be transmitted to the second casing through the internal structure of the mobile terminal or the air inside the mobile terminal, which in turn induces the second casing to vibrate. Such vibration will be perceived by the user during use, causing a worse user experience.

Therefore, it is necessary to provide a control method and system for reducing the vibration of the second casing of the mobile terminal.

SUMMARY

Accordingly, the present disclosure is directed to a control method and system capable of counteracting vibration of a second casing.

In one independent aspect, a control method for reducing vibration of a second casing of a mobile terminal is provided. The mobile terminal includes a first casing, the second casing and an exciter. The exciter and the first casing cooperate to form a driving system that induces the second casing to vibrate. The control method includes: providing an additional vibrator for driving the second casing to vibrate with a phase opposite to that of the vibration of the second casing induced by the driving system; selecting a mounting area M on the second casing for mounting the additional vibrator therein, and measuring a vibration response $Y_1(S)$ in the mounting area M under a first preset condition and a vibration response $Y_2(S)$ in the mounting area M under a second preset condition, respectively, where the first preset condition includes activating the exciter with a signal $X_1(S)$ input to the exciter while deactivating the additional vibrator, and the second preset condition includes deactivating the exciter while activating the additional vibrator with the signal $X_1(S)$ input to the additional vibrator; calculating system transfer functions $H_1(S)$ and $H_2(S)$ of the driving system and the additional vibrator according to equations $H_1(S)=Y_1(S)/X_1(S)$ and $H_2(S)=Y_2(S)/X_1(S)$, respectively; providing a signal processing unit connected to the additional vibrator for processing the input signal of the additional vibrator, calculating a vibration response $Y_3(S)$ in the mounting area M under a third preset condition according to equations $Y_3(S)=H_1(S)\cdot X_1(S)+H_2(S)\cdot H(S)\cdot X_1(S)$, where H(S) is a transfer function of the signal processing unit, and the third preset condition includes activating the exciter and the additional vibrator with the signal $X_1(S)$ input to both of the exciter and the additional vibrator; adjusting a value of the transfer function H(S) of the signal processing unit such that the vibration response $Y_3(S)$ in the mounting area M under the third preset condition is zero, and calculating the value of the transfer function H(S) of the signal processing unit according to equation $H_3(S)=-H_1(S)/H_2(S)=-Y_1(S)/Y_2(S)$; and setting $H_3(S)$ as a preset transfer function of the signal processing unit, activating the exciter and the additional vibrator with the signal X(S) simultaneously input to both of the exciter and the additional vibrator, such that the additional vibrator drives the second casing to vibrate with the opposite phase to counteract the quantity of the vibration of the second casing that is induced by the driving system.

In another independent aspect, a control system for reducing vibration of a second casing of a mobile terminal is provided. The mobile terminal includes a first casing, the second casing and an exciter, and the exciter and the first casing cooperate to form a driving system that induces the second casing to vibrate. The control system includes: an additional vibrator configured to drive the second casing to vibrate with a phase opposite to that of the vibration of the second casing induced by the driving system so as to counteract quantity of the vibration of the second casing that is induced by the driving system; and a signal processing unit connected to the additional vibrator and configured to process an input signal of the additional vibrator, wherein the exciter and the additional vibrator have the same input signal.

In some embodiments, the additional vibrator may be one of a vibration motor and a piezoelectric vibrator.

In some embodiments, one or more additional vibrators may be provided in the mounting area M with each signal processing unit corresponding to one additional vibrator.

In some embodiments, the mobile terminal further includes a middle frame connecting the first casing and the second casing, and the exciter is fixed to the middle frame and abuts the first casing, the first casing, the second casing and the middle frame cooperate to enclose a receiving space, and the additional vibrator is received in the receiving space and fixed to the second casing.

In some embodiments, the first casing is a screen of the mobile terminal, and the second casing is a back cover of the mobile terminal.

Compared with the related art, in the control method and system for reducing vibration of the second casing of the mobile terminal according to the present disclosure, an additional vibrator is provided on the second casing such that the additional vibrator drives the second casing to vibrate with the opposite phase, which can counteract the quantity of the vibration induced by the vibration of the first casing that is driven by the driving system, thereby improving the user experience.

DESCRIPTION OF THE EMBODIMENTS

The technical solutions in embodiments of the present disclosure will be clearly and completely described with reference to the accompanying drawings of the present disclosure. It is evident that the embodiments described are only some rather than all embodiments of the present disclosure. Based on the embodiments of the present disclosure, all other embodiments obtained by those skilled in the art without making any creative effort shall be regarded as falling into the protection scope of the present disclosure.

Figure 1:
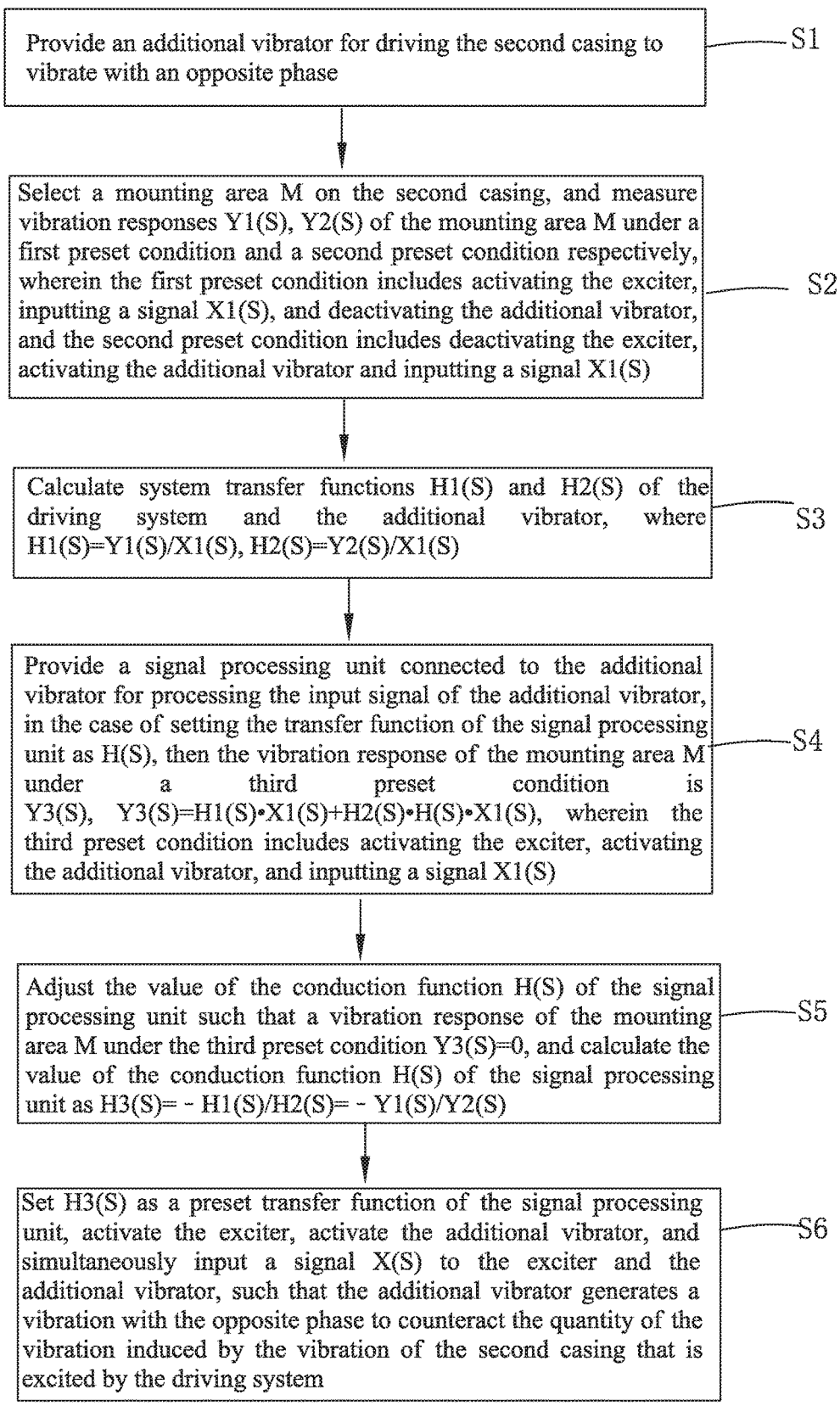
FIG. 1 is a flowchart of a control method for reducing vibration of a second casing of a mobile terminal according to one embodiment of the present disclosure.
Figure 2:
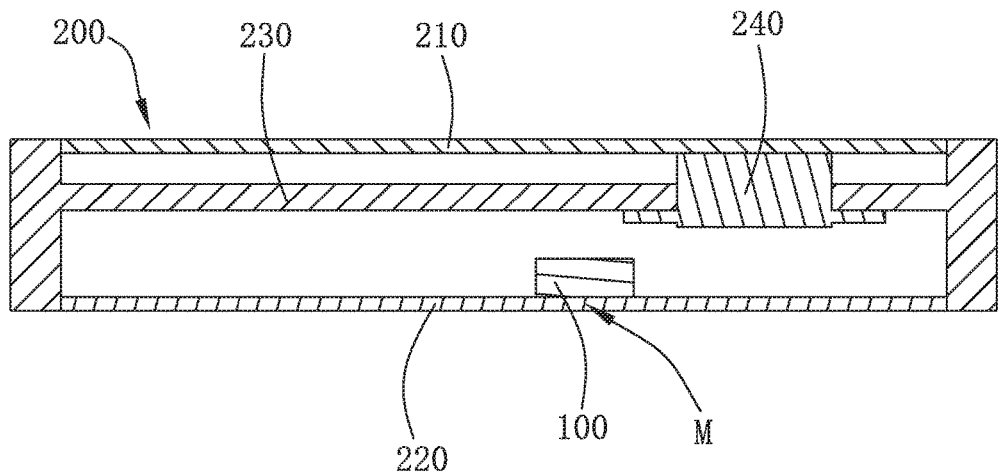
FIG. 2 is a schematic structural view of a control system for reducing vibration of a second casing of a mobile terminal according to one embodiment of the present disclosure.
Figure 3:
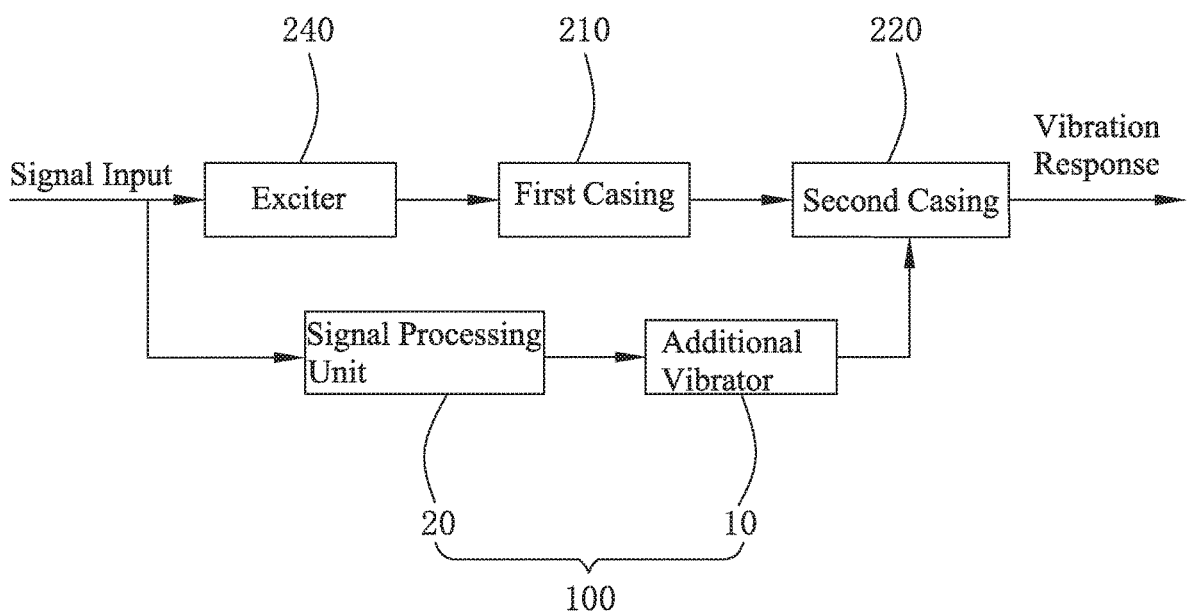
FIG. 3 is a structural block diagram of the control system shown in FIG. 2.
Figure 4:
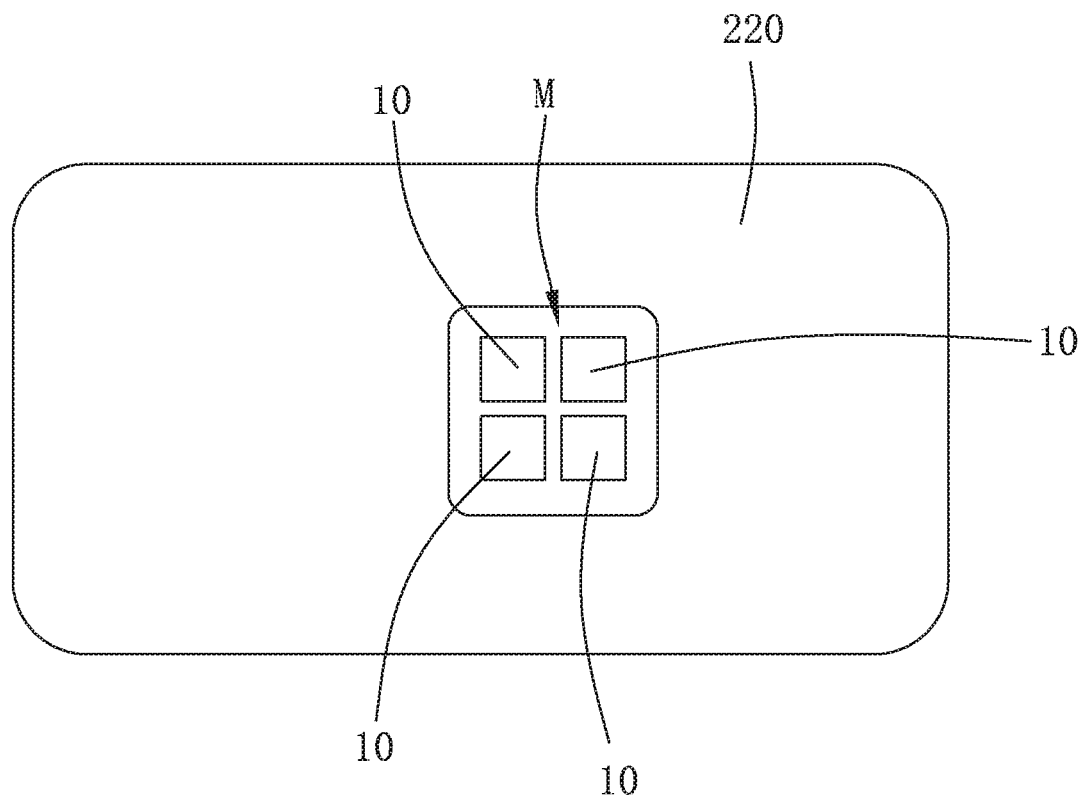
FIG. 4 is a schematic structural view of multiple additional vibrators.

Referring to FIGS. 1-4 together, the present disclosure provides a control method and control system 100 for reducing vibration of a second casing of a mobile terminal.

The mobile terminal 200 includes a first casing 210, a second casing 220, a middle frame 230 and an exciter 240. The mobile terminal 200 may be a mobile phone, a notebook, a tablet computer, a POS machine, or an on-board computer, which is not limited in the present disclosure.

The first casing 210, the second casing 220 and the middle frame 230 cooperate to enclose a receiving space. The exciter 240 is received in the receiving space and drives the first casing 210 to vibrate so as to provide tactile feedback or information reminder to the user. Specifically, the exciter 240 is fixedly connected to the middle frame 230 and abuts the first casing 210 so as to transmit the vibration better.

In this embodiment, the first casing 210 is a screen of the mobile terminal 200, and the second casing 220 is a back cover of the mobile terminal 200. In other embodiments, the first casing 210 and the second casing 220 may also be other parts of the mobile terminal. That is, the first casing 210 represents a vibration part of the mobile terminal 200 whose vibration is useful for users, and the second the casing 220 represents a vibration part of the mobile terminal 200 whose vibration is useless for users.

The exciter 240 and the first casing 210 cooperate to form a driving system that induces the second casing 220 to vibrate.

The control method includes steps as follows.

At step S1, an additional vibrator 10 is provided for driving the second casing 220 to vibrate with a phase opposite to that of the vibration of the second casing 220 induced by the driving system.

In one embodiment, the second casing 220 is made of 3D glass and has a small thickness. When the exciter 240 drives the first casing 210 to vibrate, the vibration of the first casing 210 may be transmitted to the second casing 220 via the internal structure of the mobile terminal 200, which induces the second casing 220 to vibrate. Also, the vibration of the air inside the receiving space may induce the second casing 220 to vibrate.

The additional vibrator 10 is received in the receiving space and abuts the second casing 220. When a signal is input, the additional vibrator 10 is driven to vibrate with the opposite phase, which can counteract the vibration of the second casing 220 induced by the driving system, thereby eliminating the vibration of the second casing 220. It can be understood that a vibration direction of the vibration driven by the additional vibrator 10 is opposite to a vibration direction of the vibration induced by the driving system. Preferably, the additional vibrator 10 includes a vibration motor or a piezoelectric vibrator.

At step S2, a mounting area M on the second casing 220 is selected for mounting the additional vibrator 10 in the selected mounting area M, and vibration responses at the position M are measured under a first preset condition $Y_1(S)$ and a second preset condition $Y_2(S)$, respectively. The first preset condition includes activating the exciter 240 with a signal $X_1(S)$ input while deactivating the additional vibrator 10, and the second preset condition includes deactivating the exciter 240 while activating the additional vibrator 10 with the signal $X_1(S)$ input.

In one embodiment, the mounting area M can be an area opposing the exciter 240, because the vibration in this area generally has a relatively high quantity. Alternatively, the mounting area M can also be an area of the second casing 220 that is held by the user, so that the user's vibrating sensation caused by the vibration of the second casing 220 when the user holds the second casing 220 can be effectively alleviated or counteracted, thus improving the user experience.

It can be understood that, it is necessary for each of the exciter 240 and the additional vibrator 10 to provide an electronic switch. The turning on/off of these electronic switches is uniformly controlled by a controller to realize an automatic operation of the exciter 240 and the additional vibrator 10. It is possible to use the conventional technology in the field for the automatic operation, which will not be repeated herein.

The exciter 240 and the additional vibrator 10 are arranged in two parallel branches. To more clearly illustrate the content of the present disclosure, the two branches are defined as a first branch and a second branch, respectively. Under the first preset condition, the first branch is connected while the second branch is disconnected, and the signal $X_1(S)$ is input to drive the exciter 240 to operate. Under the second preset condition, the first branch is disconnected while the second branch is connected, and the signal $X_1(S)$ is input to drive the additional vibrator 10 to operate.

The vibration responses $Y_1(S), Y_2(S)$ can be measured by a mechanical measurement method, an optical measurement method or an electrical measurement method. The mechanical measurement method converts variation of vibration into a mechanical signal, which is then measured and recorded after being amplified by a mechanical system, and instruments commonly used in this method include a lever-type vibrometer and a Geiger vibrometer. The optical measurement method converts the variation of vibration into an optical signal, which is then displayed and recorded after being amplified by an optical system. The electrical measurement method converts the variation of vibration into an electrical signal, which is then displayed and recorded after being amplified.

At step S3, system transfer functions $H_1(S)$ and $H_2(S)$ of the driving system and the additional vibrator are calculated according to equations $H_1(S)=Y(S)/X(S)$ and $H_2(S)=Y_2(S)/X_1(S)$, respectively.

Since both the exciter 240 and the additional vibrator 10 are received in the receiving space, the influence of external factors can be excluded. Thus, the vibration responses $Y_1(S), Y_2(S)$ of the exciter 240 and the additional vibrator 10 linearly correlate with the input signal $X_1(S)$, that is, $Y_1(S)=H_1(S) \cdot X_1(S)$ and $Y_2(S)=H_2(S) \cdot X_1(S)$. The system transfer functions $H_1(S), H_2(S)$ are inherent characteristics of the driving system and the additional vibrator 10, and the system transfer functions $H_1(S), H_2(S)$ are constant if the internal structure of the mobile terminal remains unchanged.

Through the vibration responses $Y_1(S)$, $Y_2(S)$ measured in step S2 and the given input signal $X_1(S)$, values of $H_1(S)$ and $H_2(S)$ can be calculated.

At step S4, a signal processing unit 20 is provided which is connected to the additional vibrator 10 for processing the input signal of the additional vibrator 10, and a vibration response $Y_3(S)$ at the position M under a third preset condition is calculated according to equations $Y_3(S)=H_1(S) \cdot X_1(S)+H_2(S) \cdot H(S) \cdot X_1(S)$, where $H(S)$ is a transfer function of the signal processing unit 20, and the third preset condition includes activating the exciter 240 and the additional vibrator 10 with the signal $X_1(S)$ input to the exciter 240 and the additional vibrator 10.

The exciter 240 and the additional vibrator 10 are simultaneously activated such that the exciter 240 and the additional vibrator 10 simultaneously act on the second casing 220. As such, the vibration response $Y_3(S)$ in the mounting area M is a superposition of the vibration response induced by the exciter 240 and the vibration response driven by the additional vibrator 10. It can be understood that, the vibration of the second casing 220 induced by the exciter 240 is a positive vibration while the vibration of the second casing 220 driven by the additional vibrator 10 is a negative vibration, such that the two vibrations counteract each other.

When the signal processing unit 20 is in operation, the actually input signal of the additional vibrator 10 is $H(S) \cdot X_1(S)$. Since the quantity of the vibration driven by the additional vibrator 10 positively correlates with the input signal, the vibration response actually caused by the additional vibrator 10 is $H_2(S) \cdot H(S) \cdot X_1(S)$.

At step S5, a value of the transfer function $H(S)$ of the signal processing unit 20 is adjusted such that the vibration response $Y_3(S)$ in the mounting area M under the third preset condition is zero, i.e., $Y_3(S)=0$, and the value of the transfer function $H(S)$ of the processing unit at this time is calculated according to equation $H_3(S)=-H_1(S)/H_2(S)=-Y_1(S)/Y_2(S)$.

When the vibration response in the mounting M under the third preset condition is zero, the vibration in mounting area M can be completely eliminated so as to improve the user experience. At this time, the value of the transfer function $H(S)$ is calculated according to equation $H_3(S)=-H_1(S)/H_2(S)=-Y_1(S)/Y_2(S)$.

At step S6, $H_3(S)$ is set as a preset transfer function of the signal processing unit, and the exciter and the additional vibrator 10 are activated with the signal $X(S)$ simultaneously input to both of the exciter 240 and the additional vibrator 10, such that the additional vibrator 10 drives the second casing 220 to vibrate with the opposite phase, which counteracts the quantity of the vibration of the second casing 220 induced by the driving system.

Since the signal processing unit 20 is received in the receiving space, the influence of external factors can be excluded. Thus, in the case that the internal structure of the mobile terminal 200 remains unchanged, the value of the system transfer function $H(S)$ of the signal processing unit 20 is a constant value. Then, the vibration response $Y(S)$ at the position M is always kept at zero under different input signal conditions once the calculated $H_3(S)$ is directly set as a preset transfer function of the signal processing unit 20.

It can be understood that one or more additional vibrators 10 may be provided in the mounting area M. When multiple additional vibrators 10 are provided, the quantity of the additional vibration driven by the multiple additional vibrators 10 are superimposed on each other to counteract the quantity of the vibration of the second casing 220 induced by the driving system, which still belongs to the concept of the present disclosure.

Compared with the related art, in the control method and system for reducing vibration of the second casing of the mobile terminal according to the present disclosure, the additional vibrator is provided on the second casing such that the additional vibrator drives the second casing to vibrate with the opposite phase, thereby counteracting the quantity of the vibration induced by the vibration of the first casing that is driven by the driving system, and hence improving the user experience.

The above shows and describes the embodiments of the present disclosure. It is understanble that the embodiments above are only examplary, and should not be interpreted as limiting the present disclosure, and those skilled in the art can make changes, modifications, replacements and deformations to the embodiments above within the scope of the present disclosure.

What is claimed is:

1. A control method for reducing vibration of a second casing of a mobile terminal, wherein the mobile terminal includes a first casing, the second casing and an exciter, and the exciter and the first casing cooperate to form a driving system that induces the second casing to vibrate, the control method includes:

providing an additional vibrator for driving the second casing to vibrate with a phase opposite to that of the vibration of the second casing induced by the driving system;

selecting a mounting area M on the second casing for mounting the additional vibrator therein, and measuring a vibration response $Y_1(S)$ in the mounting area M under a first preset condition and a vibration response $Y_2(S)$ in the mounting area M under a second preset condition, respectively, where the first preset condition includes activating the exciter with a signal $X_1(S)$ input to the exciter while deactivating the additional vibrator, and the second preset condition includes deactivating the exciter while activating the additional vibrator with the signal $X_1(S)$ input to the additional vibrator;

calculating system transfer functions $H_1(S)$ and $H_2(S)$ of the driving system and the additional vibrator according to equations $H_1(S)=Y_1(S)/X_1(S)$ and $H_2(S)=Y_2(S)/X_1(S)$, respectively;

providing a signal processing unit connected to the additional vibrator for processing the input signal of the additional vibrator, calculating a vibration response $Y3(S)$ in the mounting area M under a third preset condition according to equations $Y_3(S)=H(S) \cdot X_1(S)+H_2(S) \cdot H(S) \cdot X_1(S)$, where $H(S)$ is a transfer function of the signal processing unit, and the third preset condition includes activating the exciter and the additional vibrator with the signal $X1(S)$ input to both of the exciter and the additional vibrator;

adjusting a value of the transfer function $H(S)$ of the signal processing unit such that the vibration response $Y_3(S)$ in the mounting area M under the third preset condition is zero, and calculating the value of the transfer function $H(S)$ of the signal processing unit according to equation $H_3(S)=-H_1(S)/H_2(S)=-Y_1(S)/Y_2(S)$; and setting $H_3(S)$ as a preset transfer function of the signal processing unit, activating the exciter and the additional vibrator with the signal $X(S)$ simultaneously input to both of the exciter and the additional vibrator, such that the additional vibrator drives the second casing to vibrate with the opposite phase to counteract the quantity of the vibration of the second casing that is induced by the driving system.

2. The control method according to claim 1, wherein the additional vibrator is one of a vibration motor and a piezoelectric vibrator.

3. The control method according to claim 1, wherein one or more additional vibrators are provided in the mounting area M with each signal processing unit corresponding to one additional vibrator.

4. The control method according to claim 1, wherein the mobile terminal further includes a middle frame connecting the first casing and the second casing, and the exciter is fixed to the middle frame and abuts the first casing, the first casing, the second casing and the middle frame cooperate to enclose a receiving space, and the additional vibrator is received in the receiving space and fixed to the second casing.

5. The control method according to claim 4, wherein the first casing is a screen of the mobile terminal, and the second casing is a back cover of the mobile terminal.

6. A control system for reducing vibration of a second casing of a mobile terminal, wherein the mobile terminal includes a first casing, the second casing and an exciter, and the exciter and the first casing cooperate to form a driving system that induces the second casing to vibrate, wherein the control system includes:

an additional vibrator configured to drive the second casing to vibrate with a phase opposite to that of the vibration of the second casing induced by the driving system so as to counteract quantity of the vibration of the second casing that is induced by the driving system; and a signal processing unit connected to the additional vibrator and configured to process an input signal of the additional vibrator, wherein the exciter and the additional vibrator have the same input signal.

7. The control system according to claim 6, wherein the additional vibrator is one of a vibration motor and a piezoelectric vibrator.

8. The control system according to claim 6, wherein one or more additional vibrators are provided in the mounting area M with each signal processing unit corresponding to one additional vibrator.

9. The control system according to claim 6, wherein the mobile terminal further includes a middle frame connecting the first casing and the second casing, and the exciter is fixed to the middle frame and abuts the first casing, the first casing, the second casing and the middle frame cooperate to enclose a receiving space, and the additional vibrator is received in the receiving space and fixed to the second casing.

10. The control system according to claim 9, wherein the first casing is a screen of the mobile terminal, and the second casing is a back cover of the mobile terminal.

* * * * *